(12) United States Patent
Schneider et al.

(10) Patent No.: US 8,087,550 B2
(45) Date of Patent: Jan. 3, 2012

(54) CONVERTIBLE DEVICE FOR DISPENSING MATERIAL HAVING PARTS THAT CAN BE RETAINED ON THE DEVICE

(75) Inventors: Mark Schneider, Moorestown, NJ (US); Joseph B. Hanni, Cherry Hill, NJ (US)

(73) Assignee: Albion Engineering Company, Moorestown, NJ (US)

( * ) Notice: Subject to any disclaimer, the term of this patent is extended or adjusted under 35 U.S.C. 154(b) by 692 days.

(21) Appl. No.: 11/697,482

(22) Filed: Apr. 6, 2007

(65) Prior Publication Data

US 2007/0235475 A1    Oct. 11, 2007

Related U.S. Application Data

(60) Provisional application No. 60/790,214, filed on Apr. 7, 2006.

(51) Int. Cl.
*B65D 88/54* (2006.01)
*B67D 7/60* (2010.01)

(52) U.S. Cl. .......... 222/325; 222/327; 222/386

(58) Field of Classification Search .......... 222/325, 222/327, 386, 105, 326, 386.5
See application file for complete search history.

(56) References Cited

U.S. PATENT DOCUMENTS

| | | | | |
|---|---|---|---|---|
| 4,741,462 | A | * | 5/1988 | Schneider, Jr. ............ 222/386 |
| 4,840,293 | A | * | 6/1989 | Segatz ..................... 222/94 |
| 4,957,223 | A | | 9/1990 | Beilush |
| 5,022,563 | A | | 6/1991 | Marchitto et al. |
| 5,211,312 | A | * | 5/1993 | Chang ................... 222/153.01 |
| 5,240,141 | A | | 8/1993 | Blette |
| 5,301,835 | A | | 4/1994 | Fulks et al. |
| 5,323,931 | A | | 6/1994 | Robards, Jr. et al. |
| 5,370,271 | A | * | 12/1994 | Segatz ..................... 222/95 |
| 5,390,831 | A | | 2/1995 | Schneider |
| 6,260,737 | B1 | | 7/2001 | Gruendeman |
| 6,382,466 | B1 | | 5/2002 | Schneider et al. |
| 6,464,112 | B2 | | 10/2002 | Summons et al. |
| 6,640,998 | B1 | | 11/2003 | Kern |

* cited by examiner

*Primary Examiner* — Kevin P Shaver
*Assistant Examiner* — Stephanie E Williams
(74) *Attorney, Agent, or Firm* — Caesar, Rivise, Bernstein, Cohen & Pokotilow, Ltd.

(57) ABSTRACT

A dispensing device for dispensing viscous materials wherein the dispenser is convertible to a form which dispenses viscous material packaged in either collapsible form, cartridge form, or bulk form, wherein the components necessary for the conversion of the device to dispense viscous material packaged in collapsible form, cartridge form, or bulk form are retained within the body of the dispensing device, and more preferably are retained on the piston rod, to prevent loss of the components necessary for conversion of the dispensing device to dispense viscous material packaged in either collapsible form, cartridge form, or bulk form.

6 Claims, 4 Drawing Sheets

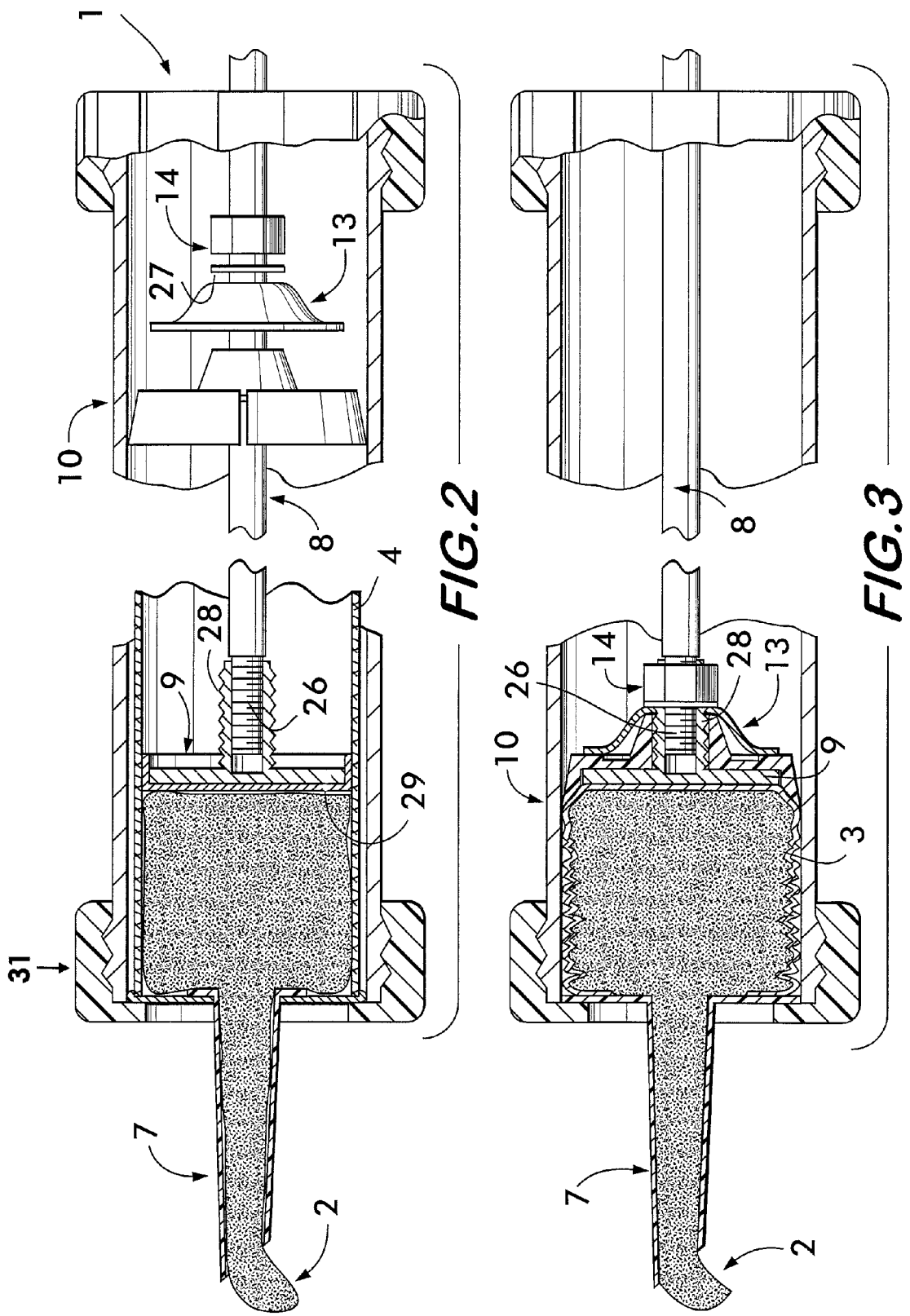

CONVERTIBLE DEVICE FOR DISPENSING MATERIAL HAVING PARTS THAT CAN BE RETAINED ON THE DEVICE

CROSS-REFERENCE TO RELATED APPLICATIONS

This application claims priority to Provisional Application 60/790,214 filed Apr. 7, 2006.

BACKGROUND OF THE INVENTION

1. Field of Invention

This invention relates generally to dispensing devices, and more specifically to dispensing devices for viscous materials. The viscous material to be dispensed with the instantly claimed device can be packaged in either collapsible form, a form in which the viscous material is present in a cartridge, or bulk form.

2. Description of Related Art

Dispensing devices for the application of various viscous material products such as caulking materials, grease, automotive windshield sealant, dual component reactive resins, adhesives, sealants, and the like, are well known throughout many industries. Such dispensing devices ideally allow the viscous material to be applied in an accurate, mess-free, and waste-free manner.

Dispensing devices are often in the form of a dispensing gun, or caulking gun. Dispensing devices generally include a squeezable handle and trigger assembly which is operative for advancing the pistons of the dispensers and for maintaining the pistons in advanced positions when the trigger portions of the dispenser devices are released. The viscous materials can be packaged in a variety of forms; some of the most common are cartridge form, collapsible form, and bulk form.

Cartridges are most often designed with a nozzle through which a viscous material composition can be extruded. These cartridges were adapted to be loaded into dispensing devices equipped with mechanisms to push the sealant composition out of the cartridge package. Cartridges, depending on the kind of storage required for the viscous material composition, are generally made from paper, foiled lined paper, plastic, and various kinds of molded and laminated constructions.

The cartridges are typically tubes having a sealed dispensing outlet, such as a conical tip, disposed on one end, with the other end being open for receiving a plunger mechanism or the like from the dispensing device. Just inside the cartridge's open end is a slidably-sealed, axially-movable piston, disc, or the like. For use, the cartridge is placed in a retaining/dispensing section of the dispensing device, and the plunger is brought into contact with the piston. When a user desires to dispense product, the cartridge's dispensing outlet is unsealed, and the plunger is forced against the piston. This forces the piston axially down the tube and against the product, which in turn is dispensed through the dispensing outlet.

Collapsible tubes are also popular containers for viscous materials. Collapsible packaging has been known in the trade for many years, and offers the benefits of providing good shelf stability for the contained chemicals, low package cost, and minimal packaging waste. Collapsible packages are generally known in the art as a "sausage" or "chub." Collapsible packaging has a collapsible wall that is, typically, sealed at each end. While collapsible package can be used to contain non-reactive viscous material products, the collapsible package is typically moisture impervious, thus allowing the collapsible package to contain reactive viscous material products also (typically reactive viscous material products are ones that react when exposed to humidity in the air).

Bulk forms of the viscous material may be used with dispensing devices which have a dispensing chamber adapted to be filled directly with the bulk viscous material. Moreover, all of these options (i.e., cartridge, bulk form, and collapsible form) can be employed in dual component dispensing devices as well as in single component dispensing devices.

A difficulty arises because the different forms of packaging of the viscous material, e.g. bulk form, cartridge form, or collapsible form, has heretofore required the configuration of the dispensing device to be changed, and often requires the removal and/or replacement of components of the dispensing device. These components can easily become lost. Therefore there exists a need in the art for a dispensing device for dispensing viscous materials wherein the dispenser is convertible to a form which dispenses viscous material packaged in either collapsible form, cartridge form, or bulk form, wherein the components necessary for the conversion of the device to dispense viscous material packaged in collapsible form, cartridge form, or bulk form are retained within the body of the dispensing device, and more preferably are retained on the piston rod, to prevent loss of the components necessary for conversion of the dispensing device to dispense viscous material packaged in either collapsible form, cartridge form, or bulk form.

All references cited herein are incorporated herein by reference in their entireties.

BRIEF SUMMARY OF THE INVENTION

It is an object of the invention to provide a dispensing device for viscous material wherein the dispensing device is convertible to a form which dispenses viscous material packaged in either collapsible form, cartridge form, or bulk form, wherein the components for the conversion of the dispenser from a form which dispenses viscous material packaged in either collapsible form, cartridge form, or bulk form, are retained within the body of the dispensing device, and more preferably on the piston rod.

BRIEF DESCRIPTION OF SEVERAL VIEWS OF THE DRAWINGS

The invention will be described in conjunction with the following drawings in which like reference numerals designate like elements and wherein:

FIG. 2 is a longitudinal section view of an embodiment of the dispenser of the instant invention wherein the dispenser is configured for dispensing viscous material in cartridge form.

FIG. 3 is a longitudinal section view of an embodiment of the dispenser of the instant invention wherein the dispenser is configured for dispensing viscous material in collapsible form.

DETAILED DESCRIPTION OF THE INVENTION

The invention provides a dispensing device for viscous material wherein the dispensing device is convertible to a form which dispenses viscous material packaged in either collapsible form, cartridge form, or bulk form, wherein the components for the conversion of the dispensing device for dispensing these different types of packages of viscous material are retained in the body of the dispensing device, and more preferably on the piston rod.

Figure 1:
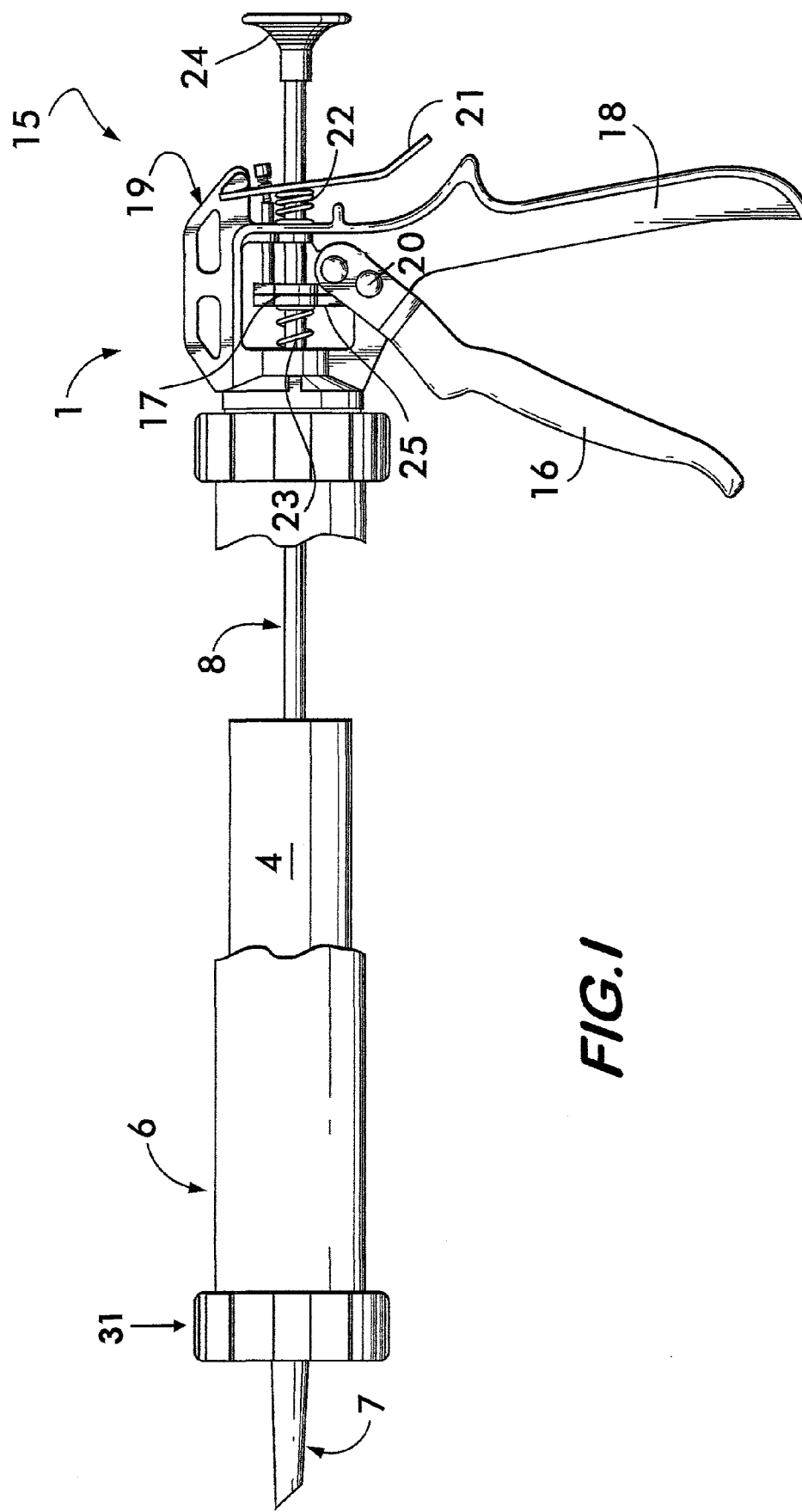
FIG. 1 is a perspective view of a dispenser for viscous material according to the invention.
Figure 4:
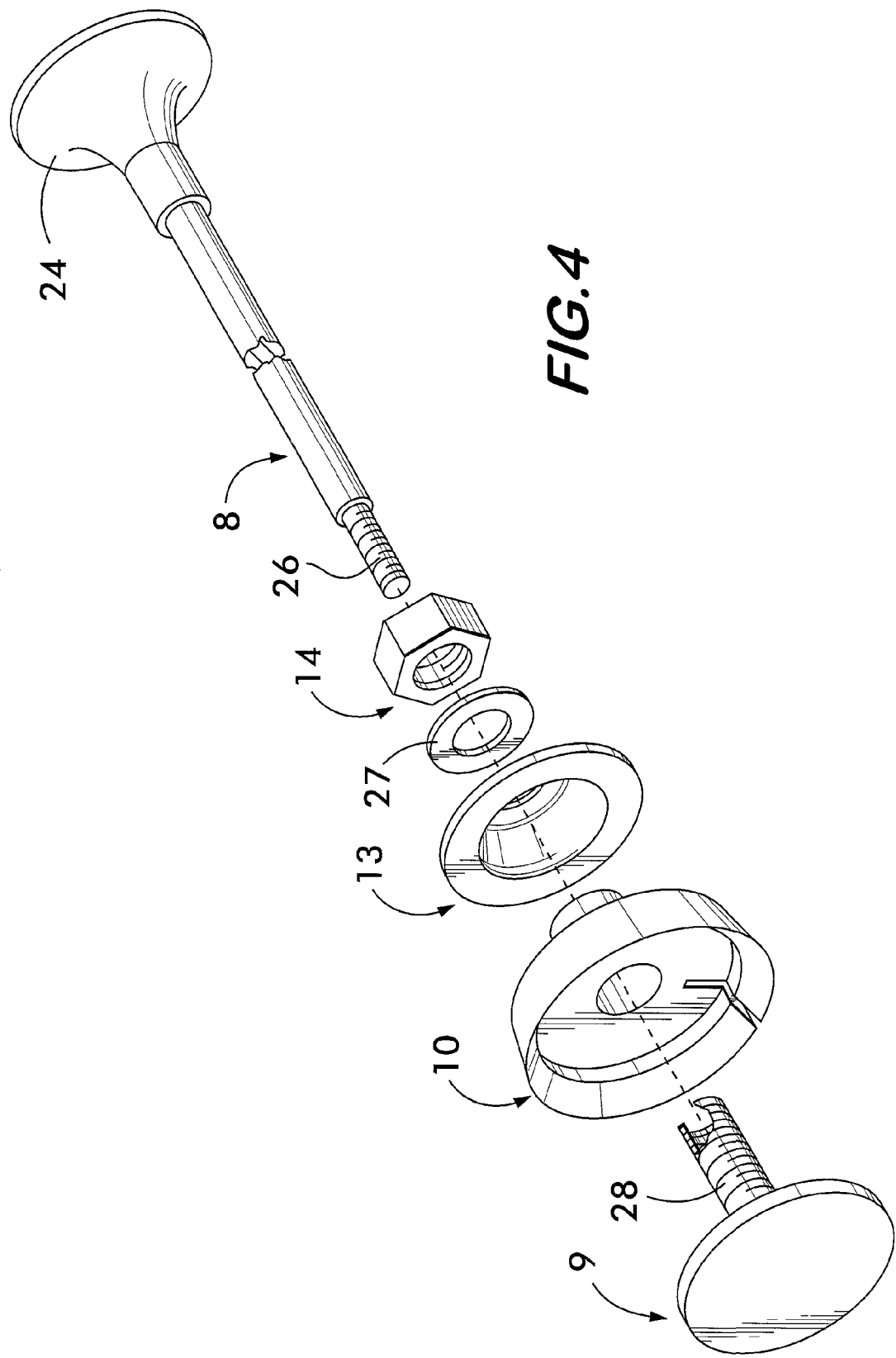
FIG. 4 is an exploded/detailed view of the piston rod and piston assembly.

Referring now to the drawings, and particularly FIGS. 1 and 4, there is shown generally a dispensing device 1 in the form of a caulking gun 15 incorporating the features of the invention. The caulking gun 15 includes a piston rod 8. As shown in FIG. 4, the piston rod 8 comprises a threaded end 26, and a return knob 24. Referring to FIG. 1, the piston rod 8 is adapted to be disposed in sliding relation within a trigger assembly 19. The trigger assembly 19 includes an operating trigger 16 and an associated handle grip 18. The trigger 16 is pivotally mounted to the trigger assembly 19 by a pin 20. A linkage 25 is disposed between the grip 18 and a gripping plate 17 to translate the pivoting motion of the trigger 16 into linear motion of the piston rod 8. Hence, actuation of the trigger 16 moves the piston rod 8 in an axial direction.

In operation, the trigger 16 is pulled toward the handle grip 18. The trigger 16 is thereby caused to pivot about the pin 20. The linkage 25 is caused to move by actuation of the trigger 16 and causes the gripping plate 17 to grip the piston rod 8. The piston rod 8 is caused to move by the movement of the trigger 16 and consequently to force the viscous material outwardly through the applicator 7, which is attached to the elongated chamber 6 by a front retainer 31. The spring 23 pushes the gripping plate 17 to return to its original position and hence the trigger 16 to return to its original position for a repeat of the action detailed above.

To prevent backward movement of the piston rod 8 following release of the trigger 16, a rear dog 21 of conventional operation is provided. The rear dog 21 includes a passage through which the piston rod 8 extends and includes a finger gripping extension at the lower end thereof. A compression spring 22 is located between and in engagement with the rear of the trigger assembly 19 and with the rear dog 21. Additionally, a return knob 24 located at the proximal end of the piston rod 8 allows withdrawal of the piston rod 8 with other components attached at its distal end (to be described below) from the viscous material to enable installation of a cartridge or collapsible form from which viscous material was dispensed. Although the return knob 24 is illustrated in FIG. 1 as being round, it is to be understood that this is not limiting and the return knob 24 can take other shapes, e.g., T-shaped, plural flat sides or square.

Figure 5:
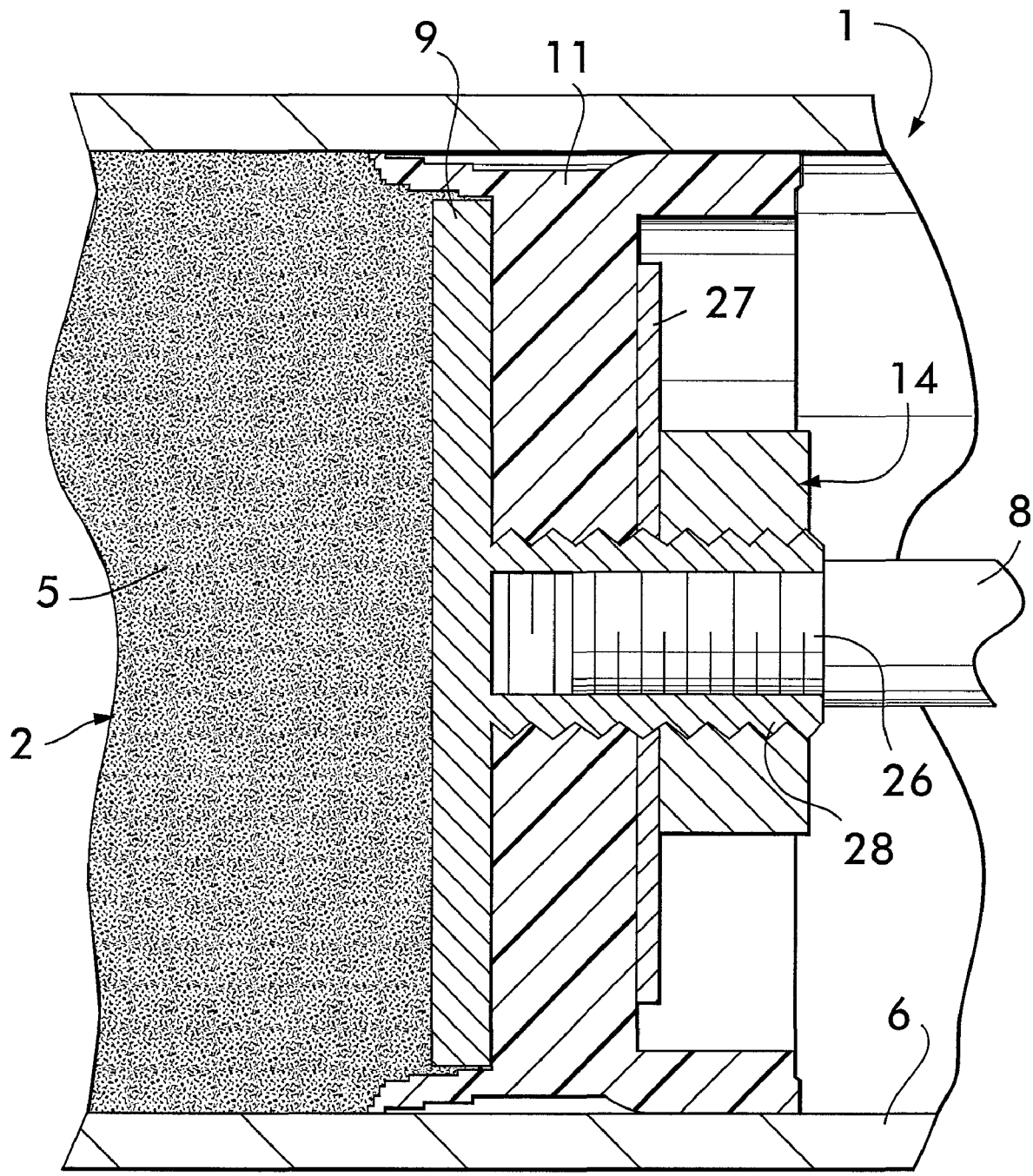
FIG. 5 is a longitudinal section view of an embodiment of the dispenser of the instant invention wherein the dispenser is configured for dispensing viscous material in bulk form.

As exemplified in FIG. 4, in a first embodiment, the piston assembly comprises the piston rod 8, an ejector 9, a piston cup 10, at least one backing washer 13, an optional flat washer 27, a nut 14, and a return knob 24. The ejector 9 has an externally threaded portion 28 on its proximal end. The ejector 9 also has internal threads for attachment to the threads 26 on the piston rod 8. In one embodiment, the piston cup 10 may include at least one slot, at least one hole, or combinations of slots and holes, and is arranged for use when the dispensing device is dispensing viscous material from a collapsible tube such as a sausage or chub. The slot or holes prevent the trapping of air between the collapsible form and the piston cup 10. As exemplified in FIG. 5, in another embodiment, the piston cup 11 may be solid and devoid of slots or holes, such that the piston cup 11 can draw a vacuum for loading of bulk viscous material into the dispensing device. The solid piston cup 11 also prevents the bulk viscous material from escaping behind the piston cup 11. Referring to FIGS. 1 and 5, the dispensing device is loaded with bulk viscous material by removing the front retainer 31 and inserting the elongated chamber 6 into a bulk material container (not shown), and the return knob 24 is pulled in a rearward direction. Since the piston cup 11 is solid, and is capable of drawing a vacuum, pulling the return knob 24 in a rearward direction, pulls the piston cup 11 in a rearward direction, and the vacuum created pulls the bulk material into the elongated chamber 6. The piston cup 11 may have at least one solid forward face or injector and be capable of drawing a vacuum. Alternatively, the piston cup 11 may have forward facing and rearward facing solid members, both members slidably sealed to the interior of the elongate chamber 6, and be capable of drawing a vacuum.

As exemplified in FIG. 2, the dispensing device 1 is configured for dispensing viscous material 2 from a cartridge 4. In this configuration, the ejector 9 is attached to the threads 26 at the distal end of the piston rod 8. The nut 14 is loosened from the threads 28 of the ejector 9 and can be slid back in the proximal direction along the length of the piston rod 8 thus allowing the at least one backing washer 13, the optional flat washer 27, and the piston cup 10, to also be slid back in the proximal direction and be retained on the piston rod 8 to reduce the possibility of these parts being lost during dispensing of viscous material from a cartridge. In operation, referring to FIGS. 1 and 2, the trigger 16 is pulled toward the handle grip 18 which causes the piston rod 8 to move forward, and the ejector 9 on the distal end of the piston rod 8 engages the plunger 29 on the cartridge 4, causing the plunger 29 to move forward, and force the viscous material 2 outwardly through the applicator 7.

As exemplified in FIG. 3, the dispensing device 1 is configured for dispensing viscous material 2 from a collapsible form package 3. In this configuration, the ejector 9 is attached to the threaded end 26 of the piston rod 8. Situated next to the ejector 9 is a piston cup 10 which may comprise one or more holes or slits, or combination thereof. Situated next to the piston cup 10 is a rigid backing washer 13. The piston cup 10 and the backing washer 13 are secured to the distal end of the piston rod 8 and held against the ejector 9 by a nut 14 tightened onto the threads 28 of the piston rod 8.

In operation, referring to FIGS. 1 and 3, the trigger 16 is pulled toward the handle grip 18 which causes the piston rod 8 to move forward, and the piston cup 10, which is being held against the ejector 9 by the nut 14 and the at least one backing washer 13 on the distal end of the piston rod 8 engages the proximal end of the collapsible form 3, which forces the viscous material 2 outwardly through the applicator 7. The slit or one or more holes in the piston cup 10 prevents the trapping of air behind the collapsible form 3.

As exemplified in FIG. 5, the dispensing device 1 is configured for dispensing viscous material 2 in bulk form 5. In this configuration, the ejector 9 is threadedly attached to the threads 26 on the distal end of the piston rod 8, and the nut 14 is tightened onto the threads 28 on the ejector 9 at the proximal end of the ejector 9, wherein the piston cup 11, and flat washer 27 are held against the ejector 9, as well as any other components necessary for the conversion. In this configuration the piston cup 11 has an outer peripheral edge sealingly received in the elongate chamber 6 and slidable therein adjacent to the inner portion of the elongate chamber 6. The piston cup 11 may be solid and devoid of slots or holes, such that the piston cup 11 can draw a vacuum for loading of bulk viscous material into the dispensing device. The solid piston cup 11 prevents the bulk viscous material from escaping behind the piston cup 11. The piston cup 11 may have at least one solid forward face or injector and be capable of drawing a vacuum. The piston cup 11 may have forward facing and rearward facing solid members, both members slidably sealed to the interior of the elongate chamber 6, and be capable of drawing a vacuum.

In operation, referring to FIGS. 1 and 5, the trigger 16 is pulled toward the handle grip 18 which causes the piston rod 8 to move forward, and the ejector 9 and the piston cup 11, which is being held against the ejector 9 by the nut 14 and the flat washer 27, on the distal end of the piston rod 8 engages the bulk material 5, which forces the viscous material 2 outwardly through the applicator 7. Due to its solid construction, i.e. the lack of any slits or holes, the piston cup 11 prevents the escape of bulk material 5 behind the piston cup 11.

The dispensing device may be loaded with bulk viscous material by removing the front retainer 31 placing elongated chamber 6 into a bulk material container (not shown), and the return knob 24 is pulled in a rearward direction. Since the piston cup 11 is solid, i.e. lacking slits or holes, it is capable of drawing a vacuum by pulling the return knob 24 in a rearward direction which pulls the piston cup 11 in a rearward direction. The vacuum created pulls the bulk material into the elongated chamber 6.

In a further embodiment as exemplified in FIGS. 2 and 3, the dispensing device 1 for viscous material 2 is convertible to a form which dispenses viscous material packaged in either collapsible form 3, or cartridge form 4. As shown in FIG. 3 when the dispensing device 1 is configured for dispensing viscous material 2 in collapsible form 3, the nut 14 is engaged with the threads 28 of the ejector 9 holding the piston cup 10 and the washer 13 against the ejector 9, as well as any other components necessary for the conversion.

In operation, referring to FIGS. 1, 2 and 3 the trigger 16 is pulled toward the handle grip 18 which cause the piston rod 8 to move forward, and the piston cup 10, which is being held against the ejector 9 by the nut 14 engaged on the threads 28 on the ejector 9 on the distal end of the piston rod 8, and the ejector 9, engages the proximal end of the collapsible form 3, which forces the viscous material 2 outwardly through the applicator 7. The at least one slit or holes or combinations thereof in the piston cup 10 prevents the trapping of air behind the collapsible form.

When the dispensing device 1 is configured for dispensing viscous material 2 in a cartridge 4, the nut 14 is loosened from the threads 28 on the ejector 9, allowing the piston cup 10, the backing washer 13, the optional flat washer 27, and the nut 14 to slide away from the ejector 9, and any other components necessary for the conversion, wherein the piston cup 10, the backing washer 13, the optional flat washer 27, and the nut 14 are retained on the piston rod 8 to prevent loss of these parts and any other components necessary for the conversion.

In operation, referring to FIGS. 1 and 2, the trigger 16 is pulled toward the handle grip 18 which causes the piston rod 8 to move forward, and the ejector 9 on the distal end of the piston rod 8 engages the plunger 29 on the cartridge 4, causing the plunger 29 to move forward, and force the viscous material 2 outwardly through the applicator 7

In a further embodiment as exemplified in FIG. 5, the dispensing device 1 for viscous material 2 is convertible to a form which dispenses viscous material 2 packaged in either bulk form 5, cartridge form (not shown), or collapsible form (not shown).

When the dispensing device 1 is configured for dispensing viscous material 2 in bulk form 5, the ejector 9 is threadedly attached to the threads 26 on the distal end of the piston rod 8, and the nut 14 is tightened onto the threads 28 on the ejector 9 at the proximal end of the ejector 9, wherein the piston cup 11, and flat washer 27 are held against the ejector 9, as well as any other components necessary for the conversion. The piston cup 11 has at least one outer peripheral edge sealingly received in the elongate chamber 6 and slidable therein adjacent to the inner portion of the elongate chamber 6. The piston cup 11 may be solid and devoid of slots or holes, such that the piston cup 11 can draw a vacuum for loading of bulk viscous material into the dispensing device. The solid piston cup 11 also prevents the bulk viscous material from escaping behind the piston cup 11. The piston cup 11 may have forward facing and rearward facing solid members, both members slidably sealed to the interior of the elongate chamber, and be capable of drawing a vacuum. In operation, referring to FIGS. 1 and 5, the trigger 16 is pulled toward the handle grip 18 which causes the piston rod 8 to move forward, and the piston cup 11, which is being held against the ejector 9 by the nut 14 engaged on the threads 28 of the ejector 9 on the distal end of the piston rod 8, and the ejector 9 engages the bulk material 5, which forces the viscous material 2 outwardly through the applicator 7.

When the dispensing device is configured for dispensing viscous material 2 in collapsible form (not shown), the piston cup 11 has an outer peripheral edge sealingly received in the elongate chamber 6 and slidable therein adjacent to the inner portion of the elongate chamber 6. The piston cup 11 may be solid and devoid of slots or holes. The piston cup 11 may have forward facing and rearward facing solid members, both members slidably sealed to the interior of the elongate chamber, and be capable of drawing a vacuum. The piston assembly may further comprise at least one rigid flat washer 27. The piston assembly further comprises a nut 14, engaged on the threads 28 of the ejector 9, which holds the piston cup 11, the at least one washer 27, onto the ejector 9 for dispensing the viscous material 2 in collapsible form (not shown), as well as any other components necessary for the conversion. In operation, the trigger 16 is pulled toward the handle grip 18 which causes the piston rod 8 to move forward, and the piston cup 11, which is being held against the ejector 9 by the nut 14 and the flat washer 27, on the distal end of the piston rod, and the ejector 9, engages the proximal end of the collapsible form (not shown), which forces the viscous material 2 outwardly through the applicator 7.

When the dispensing device 1 is configured for dispensing viscous material 2 in a cartridge (not shown), the nut 14 is loosened from the threads 28 on the ejector 9, allowing the piston cup 11, the washer 27, and the nut 14 to slide away from the ejector 9, and any other components necessary for the conversion, wherein the piston cup 11, the washer 27, and the nut 14 are retained on the piston rod 8 to prevent loss of the piston cup 11, the flat washer 27, and the nut 14, and any other components necessary for the conversion. In operation, referring to FIGS. 1 and 5, the trigger 16 is pulled toward the handle grip 18 which causes the piston rod 8 to move forward, and the ejector on the distal end of the piston rod 8 engages the plunger on the cartridge (not shown), causing the plunger to move forward, and force the viscous material 2 outwardly through the applicator 7.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A dispensing device for dispensing viscous material wherein said dispensing device is convertible from being arranged to dispense viscous material in bulk to dispensing viscous material packaged in a cartridge, said cartridge including a conical tip and an internal axially-moveable disc, said device comprising:

a. an elongated chamber for housing the viscous material, said elongated chamber having an opening at a distal end comprising a passage though which the viscous material can be dispensed;
b. a piston rod in sliding relation with a trigger assembly, said piston rod having a forward end;
c. an ejector removably retained on the forward end of said piston rod, wherein said ejector is capable of engaging the axially-moveable disc within said cartridge containing the viscous material to be dispensed; and,
d. a piston cup having at least one outer peripheral edge sealingly received in said elongated chamber and slidable therein, wherein when said dispensing device is configured for dispensing viscous material in bulk, said ejector and said piston cup are situated adjacent one another on the forward end of said piston rod, and wherein when the dispensing device is configured for dispensing viscous material packaged in a cartridge, said piston cup is slid back and away from said ejector while being retained on said piston rod to reduce the possibility of the piston cup from being lost.

2. The dispensing device of claim 1, wherein said piston cup is forward facing and capable of drawing a vacuum.

3. The dispensing device of claim 1, additionally comprising at least one washer and a nut, wherein when said dispensing device is configured for dispensing viscous material in bulk, said nut is tightened on threads of said ejector, retaining said piston cup and said at least one washer in adjacent relation with said ejector on the forward end of said piston rod, and wherein when the dispensing device is configured for dispensing viscous material packaged in a cartridge, said nut is loosened from the threads of said ejector, allowing said piston cup, said nut, and said at least one washer to be slid back in the proximal direction away from said ejector, while being retained on said piston rod to reduce the possibility of these components being lost.

4. A dispensing device for dispensing viscous material wherein said dispensing device is convertible from being arranged to dispense viscous material from a collapsible package to dispensing viscous material packaged in a cartridge, said cartridge including a conical tip and an internal axially-moveable disc, said device comprising:
a. an elongated chamber for housing the viscous material, said elongated chamber having an opening at a distal end comprising a passage though which the viscous material can be dispensed;
b. a piston rod in sliding relation with a trigger assembly, said piston rod having a forward end;
c. an ejector removably retained on the forward end of said piston rod, wherein said ejector is capable of engaging the axially-moveable disc within said cartridge containing the viscous material to be dispensed; and,
d. a piston cup having at least one outer peripheral edge sealingly received in said elongated chamber and slidable therein, wherein when said dispensing device is configured for dispensing viscous material from a collapsible package, said ejector and said piston cup are retained adjacent one another on the forward end of said piston rod, and wherein when the dispensing device is configured for dispensing viscous material packaged in a cartridge, said piston cup is slid back and away from said ejector, while being retained on said piston rod to reduce the possibility of the piston cup from being lost.

5. The dispensing device of claim 4, wherein said piston cup is rearward facing.

6. The dispensing device of claim 4, additionally comprising at least one washer and a nut, wherein when said dispensing device is configured for dispensing viscous material from a collapsible package, said nut is tightened on threads of said ejector, retaining said piston cup and said at least one washer in adjacent relation with said ejector on the forward end of said piston rod, and wherein when the dispensing device is configured for dispensing viscous material packaged in a cartridge, said nut is loosened from the threads of said ejector, allowing said piston cup, said nut, and said at least one washer to be slid back in the proximal direction away from said ejector, while being retained on said piston rod to reduce the possibility of these components being lost.

* * * * *